United States Patent [19]

Tabe

[11] Patent Number: 4,991,162
[45] Date of Patent: Feb. 5, 1991

[54] TESTING APPARATUS AND METHOD FOR OPTICAL DATA STORAGE MEDIUM

[75] Inventor: Koichi Tabe, Tokyo, Japan

[73] Assignee: Kabushiki Kaisha Toshiba, Kanagawa, Japan

[21] Appl. No.: 238,365

[22] Filed: Aug. 26, 1988

[30] Foreign Application Priority Data

Aug. 29, 1987 [JP] Japan ................... 62-214155

[51] Int. Cl.$^5$ .............................................. G11B 7/00
[52] U.S. Cl. ........................................ 369/58
[58] Field of Search ............ 369/54, 58, 44.32, 44.14, 369/44.37

[56] References Cited

U.S. PATENT DOCUMENTS

| | | | |
|---|---|---|---|
| 4,425,043 | 1/1984 | van Rosmalen | 369/44.14 |
| 4,466,088 | 8/1984 | Trethewey | 369/46 |
| 4,504,939 | 3/1985 | Eberly | 369/54 |
| 4,577,301 | 3/1986 | Mathews et al. | 369/54 |
| 4,642,803 | 2/1987 | Drexler | 369/58 |
| 4,730,290 | 3/1988 | Takasago et al. | 369/54 |
| 4,780,865 | 10/1988 | Yamakawa | 369/54 |
| 4,789,974 | 12/1988 | Satoh et al. | 369/54 |
| 4,813,034 | 3/1989 | Mashimo | 369/54 |
| 4,817,077 | 3/1989 | Ono | 369/54 |

Primary Examiner—Donald McElheny, Jr.
Attorney, Agent, or Firm—Finnegan, Henderson, Farabow, Garrett, and Dunner

[57] ABSTRACT

A testing apparatus and method for an optical information memory medium such as an optical disk in an optical and noncontact manner, in which a laser light beam generated by a laser transducer is irradiated to an optical head or a reflecting mirror for tracking a groove of the optical information memory medium, and variations corresponding to mechanical characteristics such as a static deflection, a dynamic axial runout, an acceleration of axial runout, a dynamic radial runout, an acceleration of radial runout, an axial tilt angle, a circularity and the like, of the optical information memory are detected from the laser light beam reflected by the optical head or the reflecting mirror by a detector.

38 Claims, 2 Drawing Sheets

TESTING APPARATUS AND METHOD FOR OPTICAL DATA STORAGE MEDIUM

BACKGROUND OF THE INVENTION

1. Field of the Invention

The present invention relates to testing apparatus and method for determining physical characteristics, for instance, mechanical characteristics such as a static deflection, a dynamic axial runout, an acceleration of axial runout, a dynamic radial runout, an acceleration of radial runout, an axial tilt angle, a circularity and the like, of an optical information memory medium such as an optical disk or the like, using a laser light beam in an optical and noncontact operation.

2. Description of the Prior Art

Recently, an optical data storage medium such as an optical disk or the like has been widely used in a picture information memory searching apparatus, a picture reproducing apparatus or a music or sound reproducing apparatus. As disclosed in the report of "Optical Disk Test System" in the Yokogawa Technical Report, Vol. 31, No. 1, 1987, when the optical disk is manufactured, its various qualities is checked at an end step in a manufacturing process whether it can meet standard requirements or not. In a conventional method, the qualities of the optical disk are examined using an optical head, and focus and tracking servo voltages of the optical head are picked up. Then, the variation amounts of the optical head in focusing and tracking directions are calculated from the detected servo voltages to inspect mechanical characteristics such as a static deflection, a dynamic axial runout, an acceleration of axial runout, a dynamic radial runout, an acceleration of radial runout, an axial tilt angle, a circularity and the like of the optical disk.

In a conventional optical data storage medium testing apparatus, when the optical information is written in or read out of the optical disk in the optical and noncontact operation using the laser light beam, usually, it is necessary to move the optical head in a proper amount for correcting the deflection and the axial runout of the optical disk as its allowable errors, thereby accurately focusing the laser light beam onto the desired position of the optical disk.

That is, in this case, a focusing servo controller for maintaining a distance between an object lens of an optical head and a focusing surface of an optical disk to a constant and a tracking servo controller for tracing a track of the optical disk by moving the object lens in a radial direction for correcting a radial runout of a track of the optical disk are operated. Further, the focusing and tracking servo controllers include respective focusing and tracking coils, and the object lens attached to the optical head is controlled suitably to be moved in focusing and tracking directions by supplying electric current to the focusing and tracking coils. The current amounts to be fed to the focusing and tracking coils are proportional to the extent of movement of the object lens in the focusing and tracking directions, and, in turn, by detecting these current amounts as the voltage amounts, the variation amounts of the optical head in the focusing and tracking directions can be calculated. Then, the mechanical characteristics of the optical disk can be obtained from the variation amounts of the optical head. However, in the conventional apparatus, since the variation amounts of the optical head is calculated from the control current amounts for the focusing and tracking servo controllers, an accuracy, a resolving power and a responsive speed are low or insufficient in measuring the mechanical characteristics of the optical disk.

SUMMARY OF THE INVENTION

Accordingly, it is an object of the present invention to provide a testing apparatus for an optical data storage medium such as an optical disk in an optical and non-contact manner, free from the aforementioned inconveniences and defects of the prior art, which is capable of inspecting mechanical characteristics of the optical disk with a high accuracy, a high resolving power and a quick responsive speed.

It is another object of the present invention to provide a testing method for an optical data storage medium such as an optical disk in an optical and noncontact manner, free from the aforementioned inconveniences and defects of the prior art, which is capable of measuring mechanical characteristics of the optical disk with a high accuracy, a high resolving power and a quick responsive speed.

In accordance with one aspect of the invention, there is provided a testing apparatus for detecting a mechanical characteristic of an optical data storage memory which is focused by a first laser beam to reproduce data recorded on the optical data storage memory, comprising means for focusing the first laser beam toward the optical data storage memory, means for generating a second laser beam, means for directing the second laser beam toward the focusing means, means for detecting the second laser beam reflected by the focusing means to detect the location of the focusing means with respect to the optical data storage memory and means responsive to the directing means for detecting the mechanical characteristic of the optical data storage memory.

In accordance with another aspect of the invention, there is provided a testing apparatus for detecting a mechanical characteristic of an optical data storage memory, comprising means for generating a laser beam, means for directing the laser beam toward the optical data storage medium, means for detecting the laser beam reflected by the optical data storage medium to detect the location of the optical data storage medium, and means responsive to the directing mans for detecting the mechanical characteristic of the optical data storage medium.

In accordance with a further aspect of the invention, there is provided a testing apparatus for an optical information memory in an optical and noncontact manner, data storage medium for generating a laser beam, optical means for tracking a groove of the optical data storage medium and for reflecting the laser beam, and means for detecting the mechanical characteristic of the optical information memory from the laser beam reflected by the optical means.

In accordance with still another aspect of the invention, there is provided a testing method for detecting a mechanical characteristic of an optical data storage medium comprising the steps of generating a laser beam, directing the laser beam toward optical means for tracking a groove of the optical data storage medium, and detecting the mechanical characteristic of the optical data storage medium by detector means according to the laser beam reflected by the optical means.

BRIEF DESCRIPTION OF THE DRAWINGS

These and other objects, features and advantages of the present invention will more fully appear from the following description of the preferred embodiments with reference to the accompanying drawings, in which.

DESCRIPTION OF THE PREFERRED EMBODIMENTS

Figure 1:
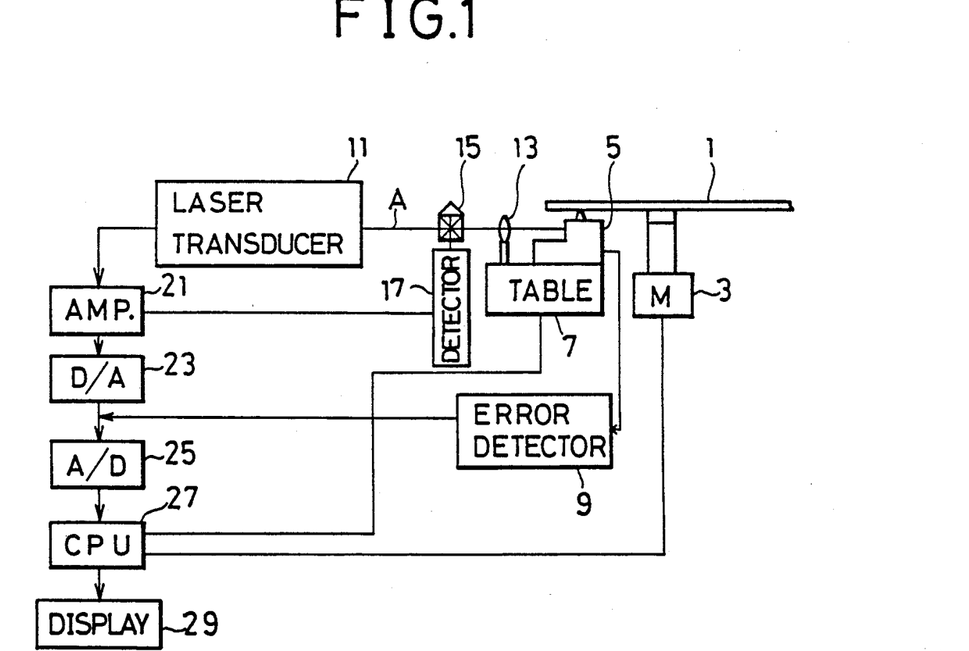
FIG. 1 is a block diagram of one embodiment of a testing apparatus for an optical data storage medium according to the present invention.
Figure 2:
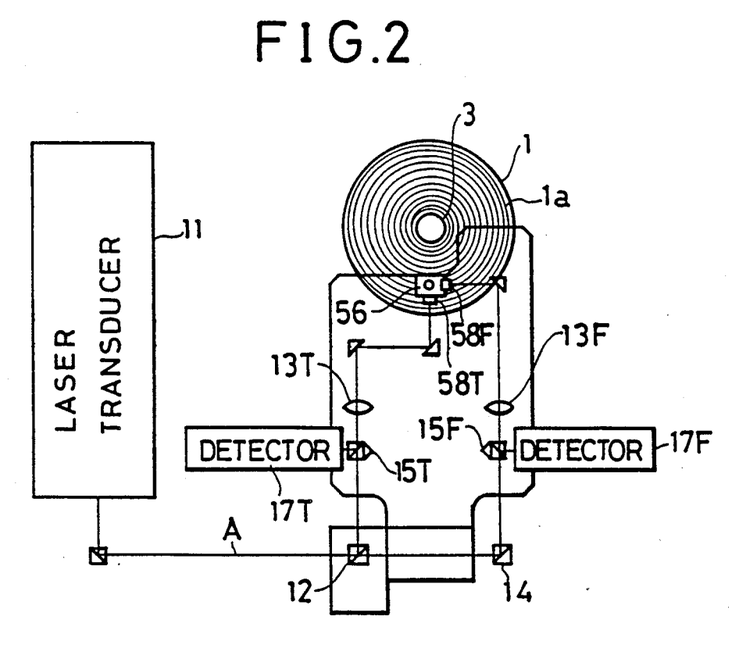
FIG. 2 is a schematic top plan view of an optical system used in the apparatus of FIG. 1.
Figure 3:
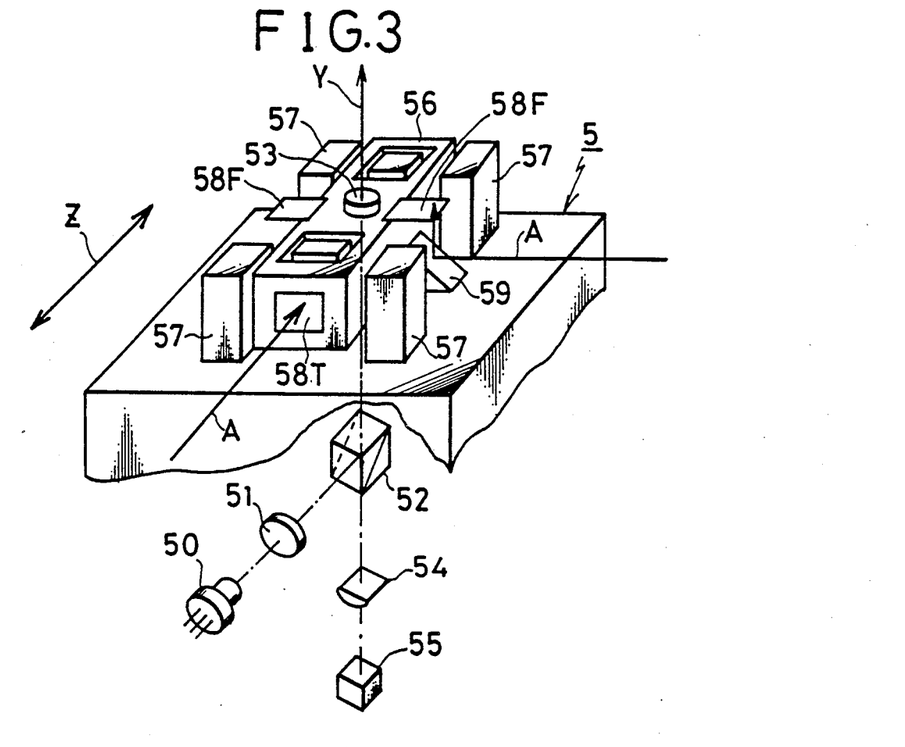
FIG. 3 is a fragmentary perspective view, partly in section, of an optical head shown in FIG. 1.

Referring now to the drawings, wherein like reference characters designate like or corresponding parts throughout the several views, there is shown in FIGS. 1 to 3 one embodiment of a testing apparatus for an optical data storage medium such as an optical disk according to the present invention.

In the drawings, a testing apparatus includes a spindle motor 3 for driving an optical disk 1 with a guide groove 1a thereon, to be examined, and an optical head 5 having an object lens 53, mounted on a movable or slidable table 7 for moving or operating the optical head 5 to the desired position of the optical disk 1. The optical head 5 is adapted to move or to vary its own position so that the object lens 53 may follow mechanical characteristics such as a static deflection, a dynamic axial runout, an acceleration of axial runout, a dynamic radial runout, an acceleration of radial runout, an axial tilt angle, a circularity and the like, of the groove 1a of the optical disk 1. That is, when the object lens 53 of the optical head 5 cannot faithfully follow the groove 1a of the optical disk due to, e.g., a deformation thereof, it skips over, i.e., does not pick up a certain amount of the optical information stored in the optical disk 1, and an error detector 9 detects such a skipped amount contained in the variation of the groove 1a of the optical disk 1, and outputs an error signal corresponding to the skipped amount.

A laser transducer 11 generates a laser light beam A, for instance, the parallel He-Ne laser light beam for detecting the variation of the groove 1a of the optical disk 1 to reflecting mirrors 58 (58T, 58F) attached to a retainer block 56 of the optical head 5 through interferometers 15 (15T, 15F) mounted to the table 7 and focusing lenses 13 (13T, 13F) mounted to the table 7, for focusing the parallel and divided laser light beams A to the respective reflecting mirrors 58 (58T, 58F). The laser light beams A reflected by the reflecting mirrors 58 are returned to the interferometers 15 (15T, 15F) via the focusing lenses 13 (13T, 13F), and the interferometers 15 (15T, 15F) interfere the reflected laser light beams with the laser light beams generated by the laser transducer 11. Then, the interfered laser light beams enter from the interferometers 15 (15T, 15F) to detectors 17 (17T, 17F) mounted to the table 7, for detecting the variations of the retainer block 56 retaining the object lens 53 in focusing and tracking directions Y and Z, which extend in a direction in parallel to an optical axis of the object lens 53, and in another direction perpendicular to the optical axis and to the direction of the track of the optical disk 1, respectively. The detectors 17 (17T, 17F) output variation signals corresponding to the focusing and tracking variations of the retainer block 56 and the object lens 53 of the optical head 5.

The variation signals are fed from the detectors 17 (17T, 17F) to an amplifier 21 for amplifying the variation signals, and the amplified variation signals are fed to a digital-analog (D/A) converter 23 for converting the digital variation signals into the analog variation signals. Then, the error signal output from the error detector 9 is added to the analog variation signals for correcting the same, and then the corrected analog variation signals are sent to an analog-digital (A/D) converter 25, and are converted into corrected digital variation signals therein. The corrected digital variation signals are input to a central processing unit (CPU) 27. The spindle motor 3 and the table 7 include respective drive controllers (not shown) therein, which successively output respective positional information signals corresponding to, e.g., a rotative angle of the spindle motor 3 and a distance of the optical head 5 from the center of the rotary axis of the motor 3 to the CPU 27. The CPU 27 operates the mechanical characteristics from the corrected digital variation signals fed from the A/D converter 25 corresponding to the positional information contained in the positional information signals sent from the spindle motor 3 and the table 7, and feeds the operated result such as the mechanical characteristics together with the positional information to a display 29. The display 29 displays the operated mechanical characteristics along with the positional information thereon.

In FIG. 2, there is shown an optical system for detecting the variations of the object lens 53 of the optical head 5 in the focusing and tracking directions Y and Z in the testing apparatus shown in FIG. 1. The laser light beam A generated from the laser transducer 11 is fed to a 50% beam splitter 12, and a 50% of the laser light beam A for detecting the tracking variation of the object lens 53 of the optical head 5 is divided in the tracking direction Z and is sent to the reflecting mirror 58T mounted to a retainer block 56 of the optical head 5 through the interferometer 15T and the focusing lens 13T. The laser light beam A reflected by the mirror 58T is returned to the interferometer 15T through the focusing lens 13T and then comes in the detector 17T, and the detector 17T detects the tracking variation of the object lens 53 of the optical head 5 from the laser light beam A.

Meanwhile, another 50% of the laser light beam A for detecting the focusing variation of the object lens 53 of the optical head 5 in the focusing direction Y, passing through the 50% beam splitter 12, is incident on the reflecting mirror 58F also mounted to the retainer block 56 of the optical head 5 through a total reflection prism 14, the interferometer 15F and the focusing lens 13F. Then, the laser light beam A is reflected by the mirror 58T to return to the interferometer 15F via the focusing lens 13F, and then enters the detector 17F. The detector 17F detects the focusing variation of the object lens 53 of the optical head 5 from the entered laser light beam A.

In FIG. 3, there is shown an essential structure of one embodiment of the optical head 5 used in the testing apparatus of FIG. 1. In the optical head 5, a laser diode 50 generates another laser light beam, and a collimator lens 51 parallels the laser light beam. The paralleled laser light beam is reflected by a half reflection prism 52 to the object lens 53 held by the retainer block 56. The object lens 53 focuses the laser light beam onto the optical disk 11 in the form of a light beam spot. The laser light beam reflected by the optical disk 11 passes through the half reflection prism 52 and a cylindrical lens 54 to come in a photo detector 55 for detecting the intensity of the incident laser light beam. The retainer block 56 is provided with a focusing coil (not shown) wound thereon for moving the retainer block 56 in the focusing direction Y, and a tracking coil (not shown) attached thereon for moving the retainer block 56 in the tracking direction Z. Four magnets 57 are arranged around the retainer block 56. The optical head 5 described above has a conventional structure, but is not restricted to this structure shown in FIG. 3.

The optical head 5 of the present invention further includes a pair of reflecting mirrors 58F for detecting the variation of the object lens 53 of the optical head 5 in the focusing direction Y and another pair of reflecting mirrors 58T for detecting the variation of the object lens 53 of the optical head 5 in the tracking direction Z, and the reflecting mirrors 58F and 58T are attached to the retainer block 56 in the planes perpendicular to the focusing and tracking directions, respectively. The optical head 5 also includes a pair of total reflection prisms 59 for reflecting the horizontally incident laser light beam A to the focusing direction in order to focus the reflected laser light beam A onto the mirrors 58F. In this embodiment, the pair of reflecting mirrors 58F or 58T are provided on the optical head 5 for applying the laser light beam A to the optical head 5 from the opposite directions, and thus only one mirrors 58F and 58T are usually used in practice.

Then, an operation of the testing apparatus described above will be described in connection with FIGS. 1 to 3.

First, the optical disk 1 is fixed to the spindle motor 3, and the spindle motor 3 is driven at a certain speed, for instance, approximately 600 r.p.m., or is rest to a standstill depending on inspection items of the mechanical characteristics, as hereinafter described in detail. Then, the inspection operation of the optical disk 1 is started by using the optical head 5.

Then, on the other hand, the laser transducer 11 is driven to generate the laser light beam A to the reflecting mirrors 58F and 58T through the 50% beam splitter 12, the total reflection prism 14, the interferometers 15F and 15T and the focusing lenses 13F and 13T, as described above, and the laser light beams A reflected by the reflecting mirrors 58F and 58T are returned to the interferometers 15F and 15T through the focusing lenses 13F and 13T, respectively. In the interferometers 15F and 15T, the returned laser light beams A are interfered with the respective laser light beams reflected by and passing through the 50% beam splitter 12 and the total reflection prism 14, and the detectors 17F and 17T receive the respectively interfered laser light beams, and output the variation signals corresponding to the focusing and tracking variations of the object lens 53 of the optical head 5 to the amplifier 21.

The variation signals are amplified in the amplifier 21, and the amplified variation signals are then sent to the D/A converter 23 and are converted into the analog variation signals. The error signal output from the error detector 9 is added to the analog variation signals to correct the skipped amount of the optical information of the optical disk 1 in the analog variation signals in response that the object lens 53 cannot follow up the mechanical characteristics of the groove of the optical disk 1. The corrected analog variation signals are then converted into the corrected digital variation signals in the A/D converter 25, and the corrected digital variation signals are operated as the focusing and tracking variations of the object lens 53 corresponding to the positional information supplied by the spindle motor 3 and the table 7 to obtain the mechanical characteristics of the optical disk 1. The obtained mechanical characteristics are displayed on the display 29 along with the positional information.

In the optical head 5, as described above, the retainer block 56 is driven in the focusing and tracking directions Y and Z by the focusing and tracking coils in response to the dynamic axial runout or the dynamic radial runout of the groove of the optical disk 1, thereby tracking the groove of the optical disk 1.

Then, the inspection of the mechanical characteristics of an optical data storage memory medium such as an optical disk using the testing apparatus described above will now be described.

Firstly, the inspection of the static deflection of the optical disk 1 is conducted. That is, the optical disk 1 is fixed to the spindle motor 3, and, while the motor 3 is rested, the surface of the optical disk 1 is scanned from the inside to the outside in the tracking direction by the optical head 5. This scanning operation is carried out three times every 120 degree rotation of the optical disk 1. The variation of the optical head 5 in the focusing direction, i.e., the static deflection is detected with respect to the distance of the optical head 5 away from the center of the optical disk 1.

The deflection and the dynamic axial runout are inspected. The motor 3 is driven to rotate the optical disk 1, e.g., at 600 r.p.m., and the surface of the optical disk 1 is entirely scanned outwards along a spiral line in the radial direction by the optical head 5 in the same manner as described above.

The dynamic axial runout is inspected. The optical disk 1 is rotated at 600 r.p.m. in the same manner as described above, and the optical head 5 is set at the predetermined radius to detect the variation of the distance between the surface of the optical disk 1 and the optical head 5, i.e., the variation in the focusing direction. This operation is repeated at five different radiuses or so. The dynamic axial runout is detected with respect to the rotative angle (0° to 360°) of the optical disk.

The inspection of the acceleration of axial runout is carried out. The optical disk 1 is rotated at 600 r.p.m. in the same manner as above, and the optical head 5 is set at the predetermined radius. Then, as the data of the dynamic axial runout is sampled, the acceleration of axial runout of the optical disk 1 in the focusing direction is detected by the optical head 5. This is conducted at 600 r.p.m. and the detected value is converted into the value at 1800 r.p.m.

The dynamic radial runout is examined. The optical disk 1 is rotated at 600 r.p.m. in the same manner as above, and the optical head 5 is set at the predetermined radius. The optical head 5 is operated so as to focus and to track the groove of the optical disk 1, and the variation of the optical head 5 in the radial direction per one rotation of the optical disk 1 is detected. From the detected data, the center of the groove of the optical disk 1 is calculated, and then the difference between the center of the groove and the center of the spindle of the motor is obtained.

The inspection of the acceleration of radial runout is conducted. The optical disk 1 is rotated at 600 r.p.m. in the same manner as above, and the optical head 5 is set at the predetermined radius. Then, as the data of the dynamic radial runout is sampled, the acceleration of radial runout of the optical disk 1 in the radial direction is detected by the optical head 5. This is carried out at 600 r.p.m., and the detected value is converted into the value at 1800 r.p.m.

The circularity of the groove of the optical disk is inspected. The optical disk 1 is rotated at 600 r.p.m. in the same manner as above, and the optical head 5 is set at the predetermined radius. Then, as the data of the dynamic radial runout is sampled, and one rotation of an average circle is described, and the variation of the radius of the circle is detected by the optical head 5.

The axial tilt angle such as a peripherally axial tilt angle or a radially axial tilt angle is inspected. First, the peripherally axial tilt angle is examined. The optical disk 1 is rotated at 600 r.p.m. in the same manner as above, and the optical head 5 is set to the predetermined radius. Then, as the data of the dynamic axial runout is sampled every certain rotative angle, e.g., 256 points per one rotation in the peripheral direction, the optical disk 1 is rotated one time, and the optical head 5 detects a variation of an angle defined by the center of the rotation and two adjacent points of the optical disk 1 during the one rotation. Second, the radially axial tilt angle is inspected. When the deflection and the dynamic axial runout are examined by scanning the surface of the optical disk 1 outwards along the spiral line in the radial direction in the same manner as described above, the data is sampled at every certain interval, e.g., 1 mm in the radial direction and every certain rotative angle, e.g., 22.5°, by the optical head 5, and the optical head 5 detects a variation of an angle defined by the center of the rotation and two adjacent points aligned along the same angular radial direction.

In the embodiment described above, the inspection of the mechanical characteristics such as the static deflection, the dynamic axial runout, the acceleration of axial runout, the dynamic radial runout, the acceleration of radial runout, the axial tilt angle, the circularity and the like, of the optical disks are conducted one by one, as described above, and, after finishing the above inspection, the obtained inspection results of the optical disks are compared with the predetermined standard values to select the optical disks meeting the standard requirements. Of course, the inspection items may be selected, as occasion demands.

As described above, in the first embodiment, since the focusing and tracking variations of the optical head, which follows the groove of the optical disk corresponding to the mechanical characteristics, are directly detected using the laser light beam without using the current amounts of the servo controllers, the inspection of the mechanical characteristics of the optical disk can be performed with a high accuracy, a high resolving power and a quick responsive speed without affecting any influences to the servo controllers of the optical head 5.

Figure 4:
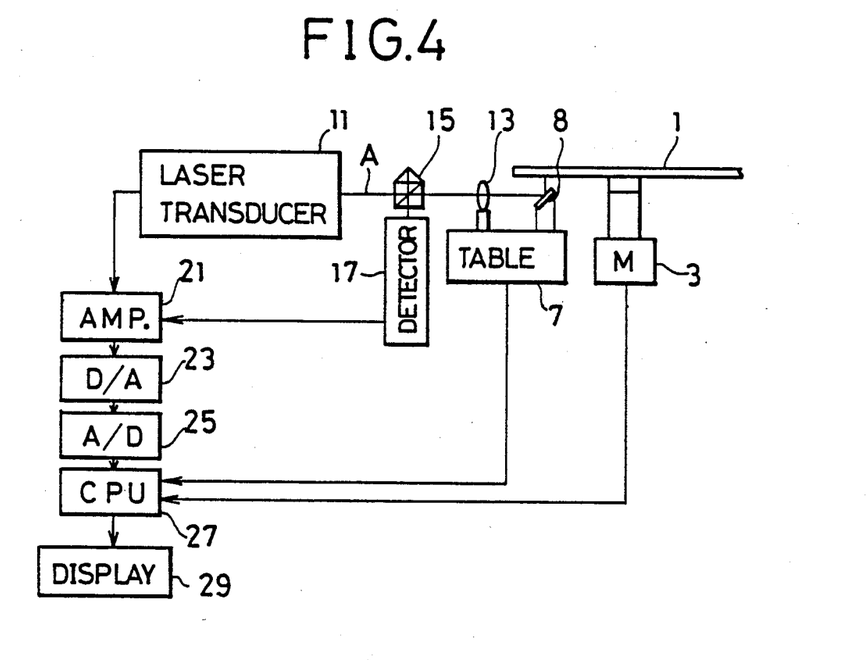
FIG. 4 is a block diagram of another embodiment of a testing apparatus for an optical data storage medium according to the present invention.

In FIG. 4, there is shown a second embodiment of a testing apparatus for an optical data storage medium according to the present invention.

In this embodiment, the testing apparatus has the same construction as the first embodiment shown in FIG. 1, except that a reflecting mirror 8 is mounted to a movable table 7, instead of the optical head 5 of the first embodiment, and is movable in the tracking direction Z, that the error detector 9 of the first embodiment is not required and can be omitted, as hereinafter described in detail, and that a single set of a focusing lens 13, an interferometer 15 and a detector 17 is mounted to the movable table 7.

Accordingly, in this case, a laser light beam A output from a laser transducer 11 is directly focused onto the surface of the optical disk 1 through the interferometer 15, the focusing lens 13 and the reflecting mirror 8, and the laser light beam A reflected by the optical disk 1 is returned to the interferometer 15 via the reflecting mirror 8 and the focusing lens 13 in the similar manner to the first embodiment described above. In the interferometer 15, the returned laser light beam is interfered with the laser light beam output from the laser transducer 11, and then the interfered laser light beam comes in the detector 17. The detector 17 outputs a variation signal representing the focusing variation of the groove of the optical disk 1 to an amplifier 21.

In the second embodiment, the depth of focus of the optical system including the focusing lens 13, the reflecting mirror 8 and the like is designed so sufficiently deep that the focusing variation of the groove of the optical disk 1 may be always picked up without any trouble. Further, since the variation of the groove of the optical disk 1 is detected by directly irradiating the laser light beam onto the surface of the optical disk 1 through the reflecting mirror 8, the focusing variation of the groove of the optical disk 1 can be more accurately picked up as compared with the first embodiment without causing any skipping over the optical information of the optical disk 1 due to the failure of the faithful following of the object lens 53 of the optical head 5 along the groove of the optical disk 1. Consequently, the error detector 9 of the first embodiment is not required and can be omitted. In this embodiment, the tracking variation of the groove of the optical disk 1 can not be detected, and hence it can be picked up by using the optical head 5 of the first embodiment, as described above.

The variation signal output from the detector 17 and the positional information signals output from a spindle motor 3 and the table 7 are operated in the same manner as the first embodiment described above and thus the detailed description thereof can be omitted for the brevity of the description.

In the second embodiment, the inspection of the mechanical characteristics of the optical disk 1 can be conducted in the same manner as the first embodiment.

As described above in connection with the preferred embodiments of the present invention, it is readily understood that, when the physical characteristics, for instance, the mechanical characteristics such as the static deflection, the dynamic axial runout, the acceleration of axial runout, the dynamic radial runout, the acceleration of radial runout, the axial tilt angle, the circularity and the like, of the optical disk are inspected, the laser light beam is applied to the optical head which moves and traces the groove of the optical head depending on the mechanical characteristics, or is directly applied to the optical disk, and the mechanical characteristics are inspected from the laser light beam reflected by the mirror attached to the optical head or by the optical disk with a high accuracy, a high resolving power and a quick responsive speed.

Although the present invention has been described in its preferred embodiments with reference to the accompanying drawings, it is readily understood that the present invention is not restricted to the preferred embodiments described above and that various changes and modifications may be made in the present invention by a person skilled in the art without departing from the spirit and scope of the present invention.

What is claimed is:

1. A testing apparatus for detecting mechanical characteristics, including at least dynamic radial runout and acceleration of radial runout, of an optical data storage medium having a groove for storing data therein, comprising:
   optical head means movable in tracking and focusing directions for tracing the groove of the optical data storage medium to pick up the data stored therein by using a first laser beam;
   means for generating a second laser beam;
   directing means for directing the second laser beam toward the optical head means along a line of the tracking direction;
   reflector means, mounted to the optical head means, for reflecting the second laser beam along the line of the tracking direction;
   detector means for detecting the second laser beam reflected by the reflector means to detect a variation of the optical head means in the tracking direction indicating a mechanical characteristic of the optical data storage medium; and
   means for processing the mechanical characteristic of the optical data storage medium on the basis of the variation detected by the detector means.

2. The apparatus of claim 1, wherein the mechanical characteristic includes circularity.

3. The apparatus of claim 1, including error detector means for detecting an erroneous variation of the optical head means to output an error signal to the processing means which corrects the erroneous variation of the optical head means on the basis of the error signal to obtain a corrected mechanical characteristic of the optical data storage medium.

4. The apparatus of claim 3, including drive means for driving the optical data storage medium and table means for movably supporting the optical head means, the drive means and table means outputting positional data to the processing means for calculating a mechanical characteristic of the optical data storage medium with respect to the positional data.

5. The apparatus of claim 4, including display means for displaying the mechanical characteristic of the optical data storage medium along with the positional data.

6. A testing apparatus for detecting mechanical characteristics, including at least one deflection and dynamic axial runout, of an optical data storage medium having a groove for storing data therein, comprising:
   optical head means movable in tracking and focusing directions for tracing the groove of the optical data storage medium to pick up the data stored therein by using a first laser beam;
   means for generating a second laser beam;
   directing means for directing the second laser beam toward the optical head means along a line of the focusing direction;
   reflector means mounted to the optical head means, for reflecting the second laser beam along the line of the focusing direction;
   detector means for detecting the second laser beam reflected by the reflector means to detect a variation of the optical head means in the focusing direction indicating a mechanical characteristic of the optical data storage medium; and
   means for processing the mechanical characteristic of the optical data storage medium on the basis of the variation detected by the detector means.

7. The apparatus of claim 6, wherein the mechanical characteristic includes acceleration of axial runout peripheral and radial axial tilt angles.

8. The apparatus of claim 6, including error detector means for detecting an erroneous variation of the optical head means to output an error signal to the processing means which corrects the erroneous variation of the optical head means on the basis of the error signal to obtain a corrected mechanical characteristic of the optical data storage medium.

9. The apparatus of claim 8, also including drive means for driving the optical data storage medium and table means for movably supporting the optical head means, the drive means and table means outputting positional data to the processing means for calculating a mechanical characteristic of the optical data storage medium with respect to the positional data.

10. The apparatus of claim 9, including display means for displaying the mechanical characteristics of the optical data storage medium along with the positional data.

11. A testing apparatus for detecting mechanical characteristics, including at least deflection and dynamic axial and radial runouts, of an optical data storage medium having a groove for storing data therein, comprising:
    optical head means movable in tracking and focusing directions for tracing the groove of the optical data storage medium to pick up the data stored therein by using a first laser beam;
    means for generating a second laser beam;
    means for splitting the second laser beam into third and fourth laser beams;
    first directing means for directing the third laser beam toward the optical head means along a line of the tracking direction;
    second directing means for directing the fourth laser beam toward the optical head means along a line of the focusing direction;
    first reflector means mounted to the optical head means, for reflecting the third laser beam along the line of the tracking direction;
    second reflector means mounted to the optical head means, for reflecting the fourth laser beam along the line of the focusing direction;
    first detector means for detecting the third laser beam reflected by the first reflector means to detect a first variation of the optical head means in the tracking direction indicating a mechanical characteristic of the optical data storage medium;
    second reflector means for detecting the fourth laser beam reflected by the second reflector means to detect a second variation of the optical head means in the focusing direction indicating another mechanical characteristic of the optical data storage medium; and
    means for processing the mechanical characteristics of the optical data storage medium on the basis of the first and second variations detected by the first and second detector means.

12. The apparatus of claim 11, wherein the mechanical characteristics includes circularity acceleration of radial runout, acceleration of axial runout and peripheral and radial axial tilt angles.

13. The apparatus of claim 11, including error detector means for detecting an erroneous variation of the optical head means to output an error signal to the processing means which corrects the erroneous variation of the optical head means on the basis of the error signal to obtain corrected mechanical characteristics of the optical data storage medium.

14. The apparatus of claim 12, including drive means for driving the optical data storage medium and table means for movably supporting the optical head means, the drive means and table means outputting positional data to the processing means for calculating the mechanical characteristics of the optical data storage medium with respect to the positional data.

15. The apparatus of claim 14, including display means for displaying the mechanical characteristics of the optical data storage medium along with the positional data.

16. A testing apparatus for detecting mechanical characteristics, including at least deflection and dynamic axial runout, of an optical data storage medium having a groove for storing data therein, comprising:
   means for generating a laser beam;
   reflector means movable in a tracking direction for tracing the groove of the optical data storage medium to pick up the data stored therein by using the laser beam and for reflecting the laser beam toward the optical data storage medium along a line of a focusing direction;
   means for focusing the laser beam to the groove of the optical data storage medium via the reflector means along the line of the focusing direction;
   detector means for detecting the laser beam reflected by the reflector means to detect a variation of the optical head means in the focusing direction indicating a mechanical characteristic of the optical data storage medium; and
   means for processing the mechanical characteristics of the optical data storage medium on the basis of the variation detected by the detector means.

17. The apparatus of claim 16, wherein the mechanical characteristic includes acceleration of axial runout and peripheral and radial axial tilt angles.

18. The apparatus of claim 16, including drive means for driving the optical data storage medium and table means for movably supporting the optical head means, the drive means and table means outputting positional data to the processing means for calculating the mechanical characteristics of the optical data storage medium with respect to the positional data.

19. The apparatus of claim 18, including display means for displaying the mechanical characteristics of the optical data storage medium along with the positional data.

20. A testing method for detecting mechanical characteristics, including at least dynamic radial runout and acceleration of radial runout, of an optical data storage medium having a groove for storing data therein, comprising the steps of:
   generating a first laser beam;
   directing the first laser beam in a tracking direction toward reflector means mounted to an optical head means movable in tracking and focusing directions for tracing the groove of the optical data storage medium to pick up the data stored therein by using a second laser beam;
   detecting a variation of the optical head means in the tracking direction from the first laser beam reflected by the reflector means; and
   processing the mechanical characteristic of the optical data storage medium on the basis of the variation of the optical head means.

21. The method of claim 20, wherein the mechanical characteristic includes circularity.

22. The method of claim 20, including detecting an erroneous variation of the optical head means and correcting the erroneous variation of the optical head means to obtain a corrected mechanical characteristic of the optical data storage medium.

23. The method of claim 20, including detecting positional data by drive means for driving the optical data storage medium and table means for movably supporting the optical head means, and processing the mechanical characteristics of the optical data storage medium with respect to the positional data.

24. The method of claim 20, including displaying the mechanical characteristics of the optical data storage medium along with the positional data.

25. A testing method for detecting mechanical characteristics, including at least deflection and dynamic axial runout dynamic, of an optical data storage medium having a groove for storing data therein, comprising the steps of:
   generating a first laser beam;
   directing the first laser beam in a focusing direction toward reflector means mounted to an optical head means movable in tracking and focusing directions for tracing the groove of the optical data storage medium to pick up the data stored therein by using a second laser beam;
   detecting a variation of the optical head means in the tracking direction from the first laser beam reflected by the reflector means; and
   processing the mechanical characteristic of the optical data storage medium on the basis of the variation of the optical head means.

26. The method of claim 25, wherein the mechanical characteristics also includes acceleration of axial runout and peripheral and radial axial tilt angles.

27. The method of claim 25, including detecting an erroneous variation of the optical head means and correcting the erroneous variation of the optical head means to obtain a corrected mechanical characteristic of the optical data storage medium.

28. The method of claim 25, including detecting positional data by drive means for driving the optical data storage medium and table means for movably supporting the optical head means, and processing the mechanical characteristic of the optical data storage medium with respect to the positional data.

29. The method of claim 25, including displaying the mechanical characteristic of the optical data storage medium along with the positional data.

30. A testing method for detecting mechanical characteristics, including at least deflection and dynamic axial and radial runouts, of an optical data storage medium having a groove for storing data therein, comprising the steps of:
   generating a first laser beam;
   splitting the first laser beam into second and third laser beams;
   directing the second laser beam in a tracking direction toward first reflector means mounted to an optical head means movable in tracking and focusing directions for tracing the groove of the optical data storage medium to pick up the data stored therein by using a fourth laser beam;

directing the third laser beam in a focusing direction toward second reflector means mounted to the optical head means;

detecting a first variation of the optical head means in the tracking direction from the second laser beam reflected by the first reflector means;

detecting a second variation of the optical head means in the focusing direction from the third laser beam reflected by the second reflector means; and processing the mechanical characteristics of the optical data storage medium on the basis of the first and second variations of the optical head means.

31. The method of claim 30, wherein the mechanical characteristics includes circularity, acceleration of radial runout, acceleration of axial runout and peripheral and radial axial tilt angles.

32. The method of claim 32, including detecting an erroneous variation of the optical head means and correcting the erroneous variation of the optical head means to obtain corrected mechanical characteristics of the optical data storage medium.

33. The method of claim 30, including detecting positional data by drive means for driving the optical data storage medium and table means for movably supporting the optical head means, and processing the mechanical characteristics of the optical data storage medium with respect to the positional data.

34. The method of claim 30, including displaying the mechanical characteristics of the optical data storage medium along with the positional data.

35. A testing method for detecting mechanical characteristics, including at least deflection and dynamic axial runout dynamic, of an optical data storage medium having a groove for storing data therein, comprising the steps of:

generating a laser beam;

focusing the laser beam to the groove of the optical data storage medium via reflector means movable in a tracking direction for tracing the groove of the optical data storage medium to pick up the data stored therein by using the laser beam and for reflecting the laser beam toward the optical data storage medium along a line of a focusing direction;

detecting a variation of the optical head means in the focusing direction from the laser beam reflected by the reflector means; and processing the mechanical characteristics of the optical data storage medium on the basis of the variation of the optical head means.

36. The process of claim 35, wherein the mechanical characteristics includes acceleration of axial runout and peripheral and radial axial tilt angles.

37. The method of claim 35, including detecting positional data by drive means for driving the optical data storage medium and table means for movably supporting the optical head means, and processing the mechanical characteristics of the optical data storage medium with respect to the positional data.

38. The method of claim 35, including displaying the mechanical characteristics of the optical data storage medium along with the positional data.

* * * * *

UNITED STATES PATENT AND TRADEMARK OFFICE
CERTIFICATE OF CORRECTION

PATENT NO. : 4,991,162
DATED : February 05, 1991
INVENTOR(S) : Koichi Tabe

It is certified that error appears in the above-identified patent and that said Letters Patent is hereby corrected as shown below:

Title Page:
Abstract, line 11, after "memory" inset --medium--.

Claim 11, column 10, line 57, change "reflector" to --detector--.

Claim 20, column 12, line 4, change "characteristic" to --characteristics--.

Signed and Sealed this

Sixteenth Day of March, 1993

Attest:

STEPHEN G. KUNIN

*Attesting Officer*     Acting Commissioner of Patents and Trademarks